United States Patent
Sato et al.

(10) Patent No.: US 7,636,283 B2
(45) Date of Patent: Dec. 22, 2009

(54) OPTICAL DISC SIGNAL RECORDING METHOD AND OPTICAL DISC APPARATUS

(75) Inventors: Nobuaki Sato, Yokohama (JP); Hiroyuki Kunitake, Mito (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 690 days.

(21) Appl. No.: 11/187,855

(22) Filed: Jul. 25, 2005

(65) Prior Publication Data
US 2006/0164945 A1  Jul. 27, 2006

(30) Foreign Application Priority Data
Jan. 25, 2005  (JP)  ............................ 2005-016321

(51) Int. Cl.
G11B 7/12       (2006.01)
G11B 7/0045     (2006.01)

(52) U.S. Cl. ................ 369/47.52; 369/47.5; 369/59.11

(58) Field of Classification Search ................ None
See application file for complete search history.

(56) References Cited

U.S. PATENT DOCUMENTS

| 6,614,739 | B1* | 9/2003 | Sasaki et al. ............... 369/59.1 |
| 7,139,230 | B2 | 11/2006 | Shirota |
| 2002/0024903 | A1* | 2/2002 | Sato ........................ 369/47.53 |
| 2002/0085470 | A1* | 7/2002 | Yokoi ....................... 369/59.11 |
| 2003/0067857 | A1* | 4/2003 | Shirota et al. ............ 369/59.12 |
| 2004/0125728 | A1* | 7/2004 | Kitagaki et al. .......... 369/59.11 |

FOREIGN PATENT DOCUMENTS

| CN | 2574170 | 9/2003 |
| JP | 61-113154 | 5/1986 |
| JP | 2001-067669 | 3/2001 |
| JP | 2001-297436 | 10/2001 |
| JP | 2003-85753 | 3/2003 |
| JP | 2004-355809 | 12/2004 |
| JP | 2005-25867 | 1/2005 |
| WO | WO 2004/066280 | 8/2004 |

* cited by examiner

*Primary Examiner*—Joseph H Feild
*Assistant Examiner*—Christopher Ray Lamb
(74) *Attorney, Agent, or Firm*—Antonelli, Terry, Stout & Kraus LLP

(57) ABSTRACT

An optical disc signal recording for forming a record mark according to a recording signal on an optical disc by applying a laser beam of a predetermined power level to the optical disc is provided. A recording pulse having a first period having a first level of Po and a width of Wh, a middle period having a second level of Pm lower than the first level Po and a width of Wm, and a last period having a level substantially equal to the first level Po and a width of Wt is generated and used for all record marks regardless of the lengths of the record marks. The record mark is formed using the generated pulse on the optical disc. As a result, setting of a write strategy is facilitated, an adjustment time in variable speed record mode is shortened, and a good recording characteristic is secured.

5 Claims, 4 Drawing Sheets

FIG.2B EMBODIMENT

1T=38.22ns (STANDARD 1x SPEED MODE)

MARGIN TO RECORDING POWER

MARGIN TO PULSE LENGTH

OPTICAL DISC SIGNAL RECORDING METHOD AND OPTICAL DISC APPARATUS

INCORPORATION BY REFERENCE

The present application claims priority from Japanese application JP2005-016321 filed on Jan. 25, 2005, the content of which is hereby incorporated by reference into this application.

BACKGROUND OF THE INVENTION

The present invention relates to an optical disc signal recording method and an optical disc apparatus.

In an optical disc apparatus for recording data using an optical disc such as CD-R/RW, DVD+R/RW or DVD-RAM, a record pit or mark is formed by applying a laser beam generated from a semiconductor laser on a recording surface of an optical disc and focusing it to cause its thermal energy to change the physical property of the recording surface. The recording principle is based on a heat accumulation phenomenon. Thus, in order to form a record mark faithful to data to be recorded, the waveform of a laser beam to be applied is devised in various ways. That is, in the optical disc apparatus, various optimum waveforms of a laser pulse are finely set previously according to the length (mark length) of a recording signal or a recording speed, and the laser beam is applied onto the optical disc based thereon. The optimum waveform setting for the laser pulse will be referred to as "write strategy", hereinafter.

In order to form a single record mark, there are employed, as typical write strategies, a system wherein the record mark is formed not using a single laser pulse but using a pulse train including a plurality of short pulses (multi-pulse type), and a system wherein two levels of amplitude of a recording pulse, that is, two levels of laser power are combined into a single composite pulse (called "castle type" because the waveform shape is similar to a castle shape) (refer to JP-A-2003-85753 and JP-A-2004-355809 as an example). With the above typical systems, a width increasing phenomenon caused in the last part of a record mark by heat accumulation can be avoided and a mark having a nearly uniform width can be formed. In a high-speed recording mode, since it is difficult to process a pulse train in the multi-pulse type, the castle type is advantageous thereover.

In the write strategies disclosed in JP-A-2003-85753 and JP-A-2004-355809, the castle type laser pulse is employed for a signal-having a long record mark; while a simple single pulse is employed for a signal having a short record mark. A single pulse is employed for a signal having a mark length of 4T (where T is a channel clock period) or shorter in JP-A-2003-85753, whereas, a single pulse is employed for a signal having a mark length of 3T in JP-A-2004-355809.

However, when the record pulse system is switched between the castle type and single pulse type according to the mark length, this also makes the setting of the write strategy complex. In particular, in such circumstances that, as a recording speed is increased, the recording system is shifted from the CLV (constant linear velocity) system to the CAV (constant angular velocity) system; a more complicated write strategy is required for the change in the recording speed and this requires an adjustment work time. This is expected that such a system will lead to difficulty in securing a good quality of recording.

SUMMARY OF THE INVENTION

In view of the above circumstances, it is an object of the present invention to provide an optical disc signal recording method which can facilitate setting of a write strategy and secure a good recording characteristic with short-time adjustment, and also to provide an optical disc apparatus using the method.

In accordance with an aspect of the present invention, there is provided a signal recording method for forming a record mark according to a write strategy by applying a laser beam of a predetermined power level to an optical disc. In the aspect, a recording pulse having a first period having a first level of Po and a width of Wh, a middle period having a second level of Pm lower than the first level Po and a width of Wm, and a last period having a level substantially equal to the first level Po and a width of Wt, is generated and used for all record marks regardless of the lengths of the record marks. And a signal is recorded on the optical disc using such a recording pulse.

In this case, the values of the levels Po, Pm and widths Wh, Wt of the recording pulse are substantially constant regardless of the length of the record mark.

When an optical disc is recorded at a variable speed, conditions suitable for the recording pulse of a reference speed are predetermined, and conditions suitable for the recording pulse of another speed are calculated and set on the basis of the predetermined conditions.

In accordance with another aspect of the present invention, there is provided an optical disc apparatus which forms a record mark according to a recording signal by applying a predetermined power level of laser beam to an optical disc. The apparatus includes an optical head for applying the laser beam of a recording pulse to the optical disc, a recording pulse generating unit for generating the recording pulse, and a memory for storing conditions for generating the recording pulse. The recording pulse generating unit generates the recording pulse according to the generation conditions stored in the memory. The recording pulse has a first period having a first level of Po and a width of Wh, a middle period having a second level Pm lower than the first level Po and a width of Wm, and a last period having a level substantially equal to the first level of Po and a width of Wt.

In accordance with the present invention, even when the recording speed is high, a recording quality can be improved.

Other objects, features and advantages of the invention will become apparent from the following description of the embodiments of the invention taken in conjunction with the accompanying drawings.

BRIEF DESCRIPTION OF THE DRAWINGS

FIG. 2B shows an example of waveform of a recording pulse used in the present embodiment;

DESCRIPTION OF THE EMBODIMENTS

Embodiment of the present invention will be explained by referring to the accompanying drawings.

Embodiment 1

Figure 1:
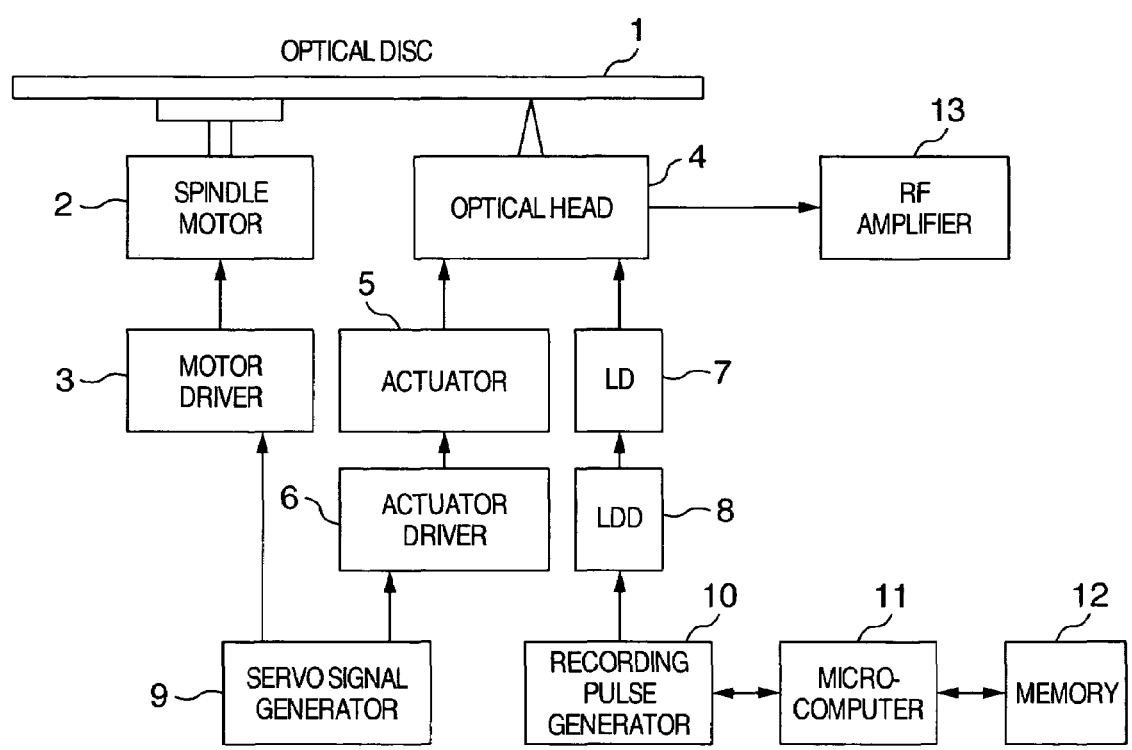
FIG. 1 is a block diagram of an optical disc apparatus in accordance with an embodiment of the present invention.

FIG. 1 shows a block diagram of an optical disc apparatus in accordance with an embodiment of the present invention. A recordable optical disc 1 such as DVD-R/RW or DVD-RAM is rotated at a predetermined speed by a spindle motor 2 and a motor driver 3. The present invention is especially effective when a system that a linear velocity on the disc varies, for example, CAV (constant angular velocity) system is employed.

A recording laser beam emitted from a semiconductor laser (LD) 7 and a laser driver (LDD) 8 is applied onto a recording surface of the optical disc 1 to record a signal. In a reproduction mode, a reproducing laser beam is applied to detect its reflected light and to read out the signal by an RF amplifier 13 therefrom. An actuator 5 and an actuator driver 6 move an optical head 4 to a desired track on the disc under tracking and focus control. A control signal for the tracking and focus control is generated by a servo signal generator 9.

A recording pulse generator 10 generates a signal indicative of the waveform of the recording pulse of the laser beam, that is, a signal indicative of its power level and timing; and then supplies the signal to the LDD 8. A constant for conversion from each input signal to a laser recording pulse waveform, that is, a write strategy is previously stored as firmware in a memory 12. A microcomputer 11 reads out the set value from the memory to apply it to each input signal and to control the recording pulse generator 10.

In the present embodiment, waveform constants suitable for castle type recording pulses of record mark lengths and speeds are previously stored in the memory 12. A waveform constant for a reference speed is stored in the memory 12, so that a waveform constant capable of maintaining a recording quality for another speed can also be found through the speed converting operation of the microcomputer 11.

Figure 2A:
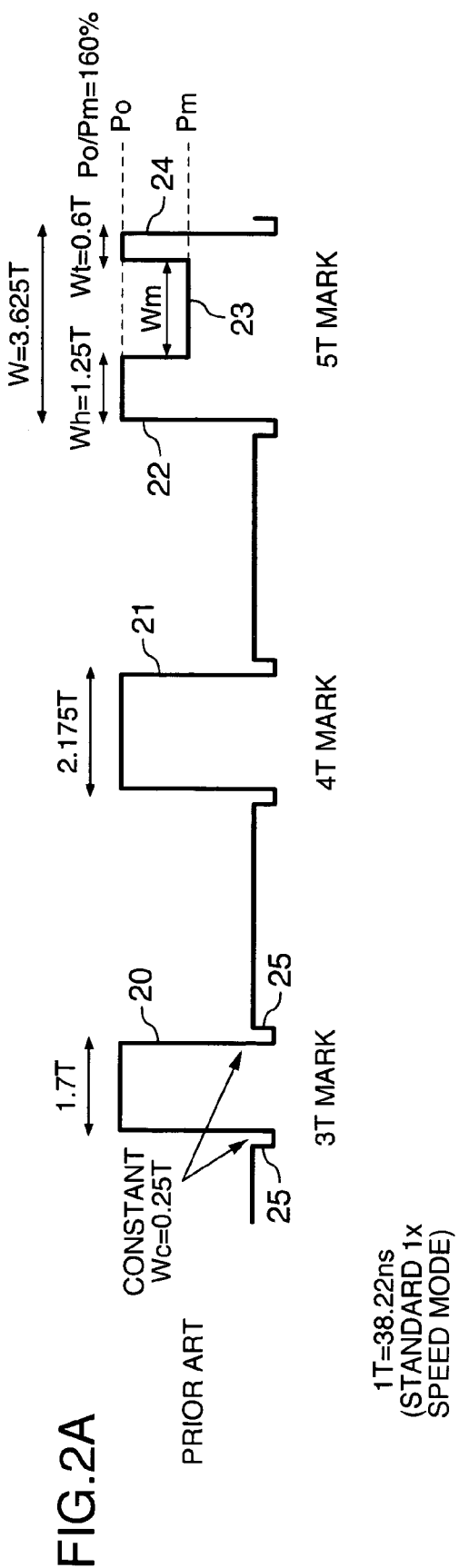
FIG. 2A shows an example of waveform of a recording pulse used in the prior art.
Figure 2A:
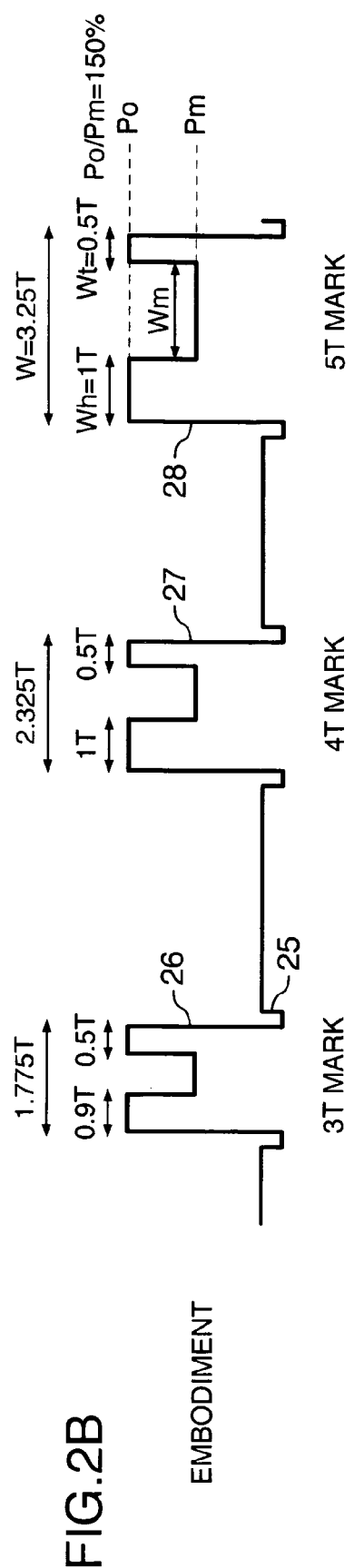

FIGS. 2A and 2B show examples of waveforms used in the prior art and in the present embodiment respectively. Recording data is, as an example, an 8-16 modulated code which has mark periods of 3T to 11T and 14T and space periods. In FIGS. 2A and 2B, mark signals 3T, 4T and 5T are illustrated. In this connection, symbol T denotes a channel clock period, and thus 1T=38.22 ns in a standard 1× speed recording/reproducing mode.

In FIG. 2A of the prior art, a single/composite pulse mixed system having single and composite pulses is employed. More specifically, when record marks are 3T and 4T marks (short mark), the marks are denoted by single pulses 20 and 21. A long mark having a channel clock period of 5T or longer is denoted by a composite pulse (referred to "castle type" in the present embodiment) having a recessed shape and having two recording levels. The castle type pulse has a first period (top pulse) 22 having a first level (high level) of Po and having a width of Wh, a middle period 23 having a second level (low level) of Pm lower than the first level Po and having a width of Wm, and a last period (last pulse) 24 having a level equal to the first level Po and a width of Wt. Numeric values (waveform constants) of these power levels Po, Pm, a power ratio Po/Pm and period lengths Wh, Wm are determined on the basis of conditions where recording qualities of asymmetry, jitter, etc. are to be optimized. For both of the single and castle type pulses, a period 25 having a cooling zero level and a width Wc is provided at rising and falling edges of their first and last periods.

In the embodiment shown in FIG. 2B, on the other hand, castle type pulses 26 and 27 are employed even for record marks for which single pulses have been used in the prior art, like short marks 3T and 4T. In this case, in order to keep a recording quality, the power level Po is set at a value larger than that in the prior art, and the power ratio Po/Pm common to the respective mark lengths and a pulse length W determined for each mark length are suitably set. As a result, it has been found that it is preferable to make substantially constant the power levels Po and Pm and the first level (high level) periods Wh and Wt regardless of the mark length. This will be detailed below.

Figure 3A:
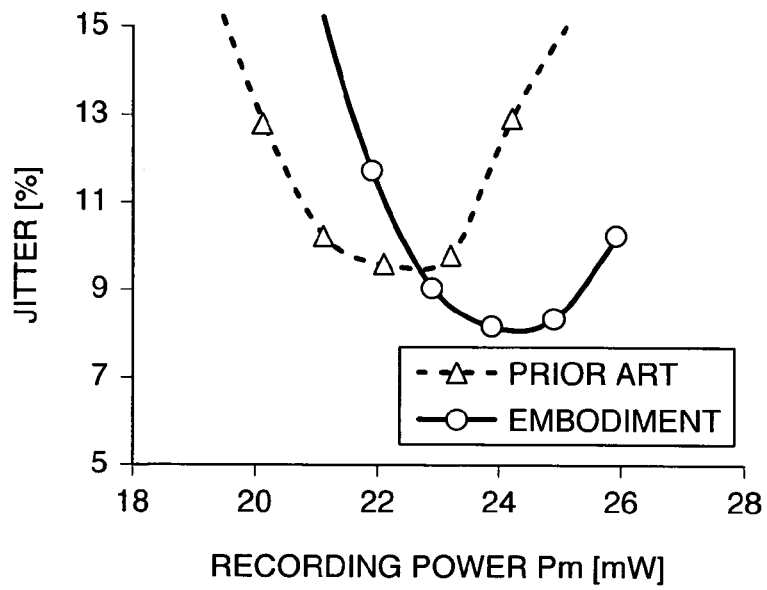
FIG. 3A shows an example of recording characteristics when the prior art is used.
Figure 3B:
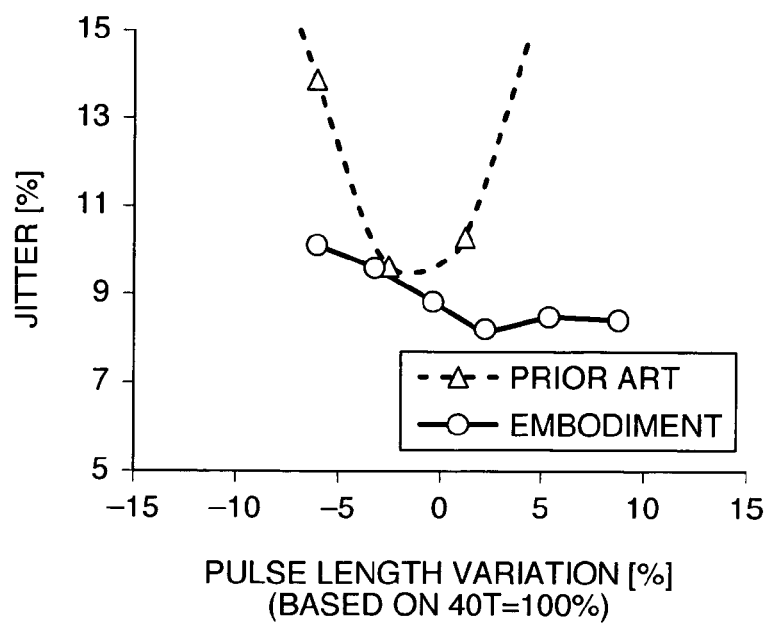
FIG. 3B shows an example of recording characteristics when the present invention is used.

FIGS. 3A and 3B show an example of recording characteristic when the present invention is applied. More specifically, FIG. 3A shows a relation of operational margin to variations in recording power. More in detail, FIG. 3A plots a jitter (expressed in ordinate) as a recording quality obtained when the recording waveform constants of FIGS. 2A and 2B are used as references and when the value of the recording level Pm (expressed in abscissa) is varied with a constant power ratio Po/Pm. In the illustrated example, the jitter corresponds to a variation in the rising edge of a reproduced binarized signal with respect to a PLL (phase locked loop) clock generated from the binarized reproduced signal. As a result, it has been found that, when compared with the conventional single/composite pulse mixed system, the system of the present embodiment employing a castle type even for the 3T and 4T marks can prevent deterioration of the jitter characteristic in the margin region, or rather can reduce the jitter, and can correspondingly enlarge the margin region.

FIG. 3B plots a variation in jitter when the recording waveform constants of FIGS. 2A and 2B are used as references and when the pulse length W is varied. It has been found that the jitter characteristic is drastically deteriorated as the pulse length varies in the prior art system; whereas, the jitter characteristic is less influenced by the pulse length variation so that a good jitter characteristic can be always obtained and thus the margin region can be enlarged in the present embodiment.

In this way, in accordance with the present embodiment, even when the power of the recording pulse or the pulse length varies, stable mark formation can be realized when compared with the prior art. Thus, stable recording quality can be maintained, even if quality variations are increasing.

In the prior art, when the length of a recording mark is short, a single pulse type is employed for the recording mark. However, it has been found from the result of the present embodiment that, when a castle type pulse is used for such a short mark, the operational margin can be improved.

Embodiment 2

The recording method of the present invention is suitable, in particular, for the CAV (constant angular velocity) system wherein the recording speed varies on the disc. Explanation will next be made as to an embodiment thereof. In the CAV system, linear velocity is increased as it goes from the inner diameter of the disc to the outer diameter thereof. Thus the recording pulse waveform is required to be set according to the velocity variation.

Figure 4:
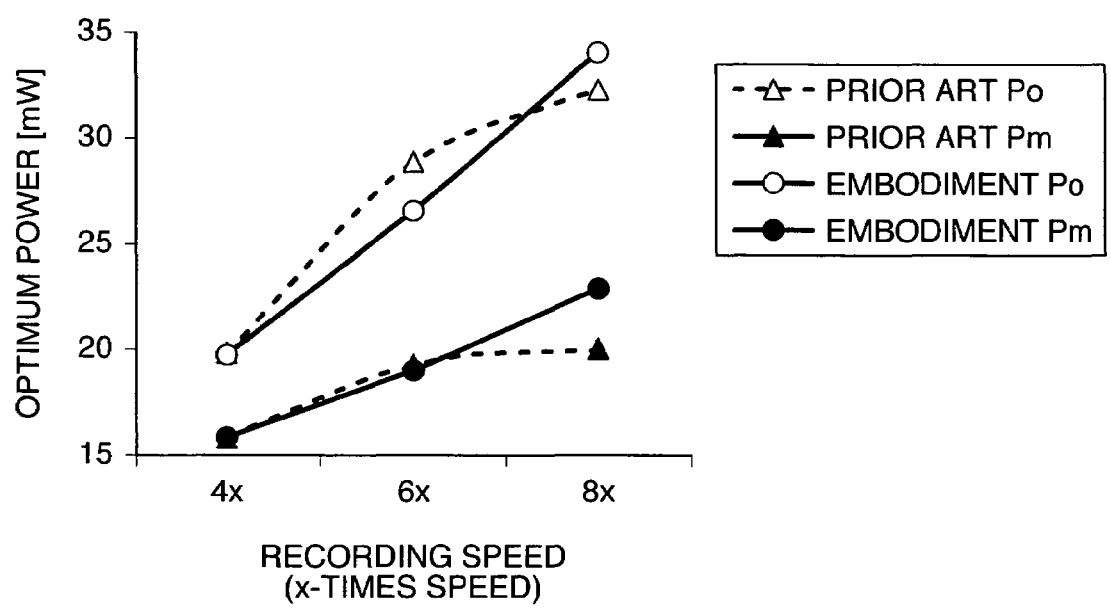
FIG. 4 shows an example of a relation between recording speed and optimum recording power in the present embodiment.

FIG. 4 shows an example of relationship between recording speed and optimum recording power with respect to the recording pulse waveforms of the above embodiment 1. Ordinate in the drawing denotes recording speed. The recording speed is changed to a quadruple (4×)-speed, a 6-times (6×) speed, and an eight-times (8×) speed; and the time width of the recording pulse is shortened as the clock period T proportionally varies. FIG. 4 plots the power levels Po (high level) and Pm (low level) when the recording quality (jitter) becomes optimum for the aforementioned speeds. An optimum power variation for each speed is nonlinear in the prior art (single/composite pulse mixed system); whereas, the optimum power variation is substantially linear in the system (using the castle type even for the 3T and 4T pulses) of the present embodiment.

In this connection, it has been found in the system of the present embodiment that the optimum power level ratio Po/Pm is also linearly varied according to the speeds (in other words, the optimum power ratio Po/Pm becomes larger as the speed increases), and the suitable pulse length W of a short mark (such as 3 T) is made larger as the speed increases.

In the prior art system, in other words, it has been difficult to estimate a write strategy such as an optimum power level to a speed, and the optimum level has been required to be determined whenever the speed is changed, involving highly troublesome control. Even if there is present another linear strategy condition, it takes a lot of labor in its readjusting work. In the system of the present embodiment, on the other hand, since the strategy condition varies linearly with the speeds, an optimum condition for the recording power level or the like can be easily estimated through linear interpolating operation. Thus, once the strategy condition of, e.g., a suitable power level for a reference speed is previously found, a suitable level for a given speed can be easily estimated and set. As a result, the readjustment of the strategy condition or complicated power control can be avoided.

In this way, in accordance with the present embodiment, a design efficiency in the variable speed recording system such as the CAV system can be increased, and quality reduction caused by speed change can be suppressed.

Although explanation has been made in connection with the example (castle type) wherein the typical recording pulse waveform has the first and last periods (the top and last pulses) in the above respective embodiments, the present invention is not limited to the specific example but may be similarly effectively applied even to a case where only the first period is made at high level (only the top pulse is used) or to a case where the above system is combined with the multi-pulse system.

In the respective embodiments, explanation has been made in connection with the example wherein the castle type is used, for example, even for the 3T and 4T marks. However, the present invention is not restricted to the specific example but may be applied to a case where the castle type is used for shorter 1T and 2T recording marks.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc signal recording method for forming a record mark according to a recording signal as a modulated code by applying a laser beam of a predetermined power level to an optical disc, comprising the steps of:

generating a recording pulse having a first period having a first power level Po and a width Wh, a middle period having a second power level Pm lower than the first power level Po and a width Wm, and a last period having a power level substantially equal to the first power level Po and a width of Wt; and forming said record mark, including a code having a length of 3T or 4T, where T represents a channel clock period, or shorter, on said optical disc using said generated recording pulse;

wherein the recording to said optical disk is based on a constant angular velocity (CAV) system, said step of generating a recording pulse includes determining and setting said power levels Po and Pm through a liner interpolation as the recording speed is changed, and determining and setting said power levels Po and Pm of said recording pulse through the linear interpolation so that a power level ratio Po/Pm becomes larger as said recording speed is increased, and wherein values of said power levels Po and Pm, and the widths Wh and Wt, of said recording pulse are substantially constant regardless of the length of said recording mark.

2. An optical disc signal recording method according to claim 1, wherein the recording to said optical disc is carried out at a variable speed by predetermining suitable conditions of said recording pulse for a reference speed, and determining and setting suitable conditions suitable of the recording pulse for another given speed through calculation on the basis of the determined suitable conditions.

3. An optical disc apparatus for forming a record mark according to a recording signal by applying a laser beam having a predetermined level to an optical disc, comprising:

an optical head which applies the laser beam of a recording pulse to said optical disc;

a recording pulse generating unit which generates a recording pulse; and a memory which stores conditions for generation of said recording pulse;

wherein said recording pulse generating unit generates the recording pulse having a first period having a first power level Po, a middle period having a second power level Pm lower than the first power level Po, a last period having a power level substantially equal to the first power level Po, a width Wh of said first period, and a width Wt of said last period substantially equal to said width Wh for all record marks regardless of the length of said record mark, and a width Wm of said middle period varied according to a length of said recording mark;

wherein, when recording to said optical disk based on a constant angular velocity (CAV) recording system, said recording pulse generating unit determines and sets said power levels Po and Pm of said recording pulse through a linear interpolation as a recording speed is changed, and determines and sets said power levels Po and Pm so that a power level ratio Po/Pm becomes larger as said recording speed is increased and wherein values of said power levels Po and Pm, and the widths Wh and Wt, of said recording pulse are substantially constant regardless of the length of said recording mark.

4. An optical disc apparatus according to claim 3, comprising:

a drive which rotatably drives said optical disc at a variable speed, wherein said memory stores said conditions for generation of said recording pulse for a reference speed, and said recording pulse generating unit determines said conditions for generation of said recording pulse for a given speed through a calculation on the basis of said conditions for generation of said recording pulse stored in the memory, and generates said recording pulse for the given speed according to the calculated conditions for generation of said recording pulse.

5. An optical disc apparatus according to claim 3, wherein said recording signal is a modulated code, and said record mark includes a code having a length of 3T or 4T, where T represents a channel clock period, or shorter and is formed on the optical disc using said generated recording pulse.

* * * * *